United States Patent [19]

Clark

[11] Patent Number: 4,912,759
[45] Date of Patent: Mar. 27, 1990

[54] DEVICE FOR SELECTIVELY DEPRESSING A TELEPHONE SWITCH

[76] Inventor: Wallace Clark, 8140 N. Township Line Rd., #2416, Indianapolis, Ind. 46260

[21] Appl. No.: 335,850

[22] Filed: Apr. 10, 1989

[51] Int. Cl.$^4$ .......................... H01H 9/22; H01M 1/00
[52] U.S. Cl. .................................. 379/447; 379/422; 379/433; 379/448
[58] Field of Search ............... 379/447, 433, 441, 448, 379/457, 440, 422

[56] References Cited

U.S. PATENT DOCUMENTS

| | | | |
|---|---|---|---|
| 2,326,591 | 8/1943 | White | 379/447 |
| 3,526,730 | 9/1970 | Horton | 379/447 |
| 4,034,167 | 7/1977 | Boyd | 379/447 |
| 4,131,768 | 12/1978 | Wood | 379/447 |
| 4,147,903 | 4/1979 | Shpall | 379/447 |
| 4,379,953 | 4/1983 | Huff | 379/447 |
| 4,435,623 | 3/1984 | Valentine | 379/447 |
| 4,614,845 | 9/1986 | Conlon | 379/448 |

OTHER PUBLICATIONS

Adveristement, Radio Shack ET-416, Folding Pocket-Size Telephone with Page Button.

*Primary Examiner*—Jin F. Ng
*Assistant Examiner*—Danita R. Byrd
*Attorney, Agent, or Firm*—Baker & Daniels

[57] ABSTRACT

A device for selectively keeping the flash button of a telephone handset depressed. The device comprises a detachable telephone handset engaging member, which when secured to the handset depresses the flash button, thereby keeping the telephone off line. When the handset engaging member is detached from the handset, the flash button is released and phone calls may be made. The device is easy to operate and makes it unnecessary to use the hook switch on the telephone cradle.

17 Claims, 1 Drawing Sheet

DEVICE FOR SELECTIVELY DEPRESSING A TELEPHONE SWITCH

FIELD OF THE INVENTION

This invention relates to telephone accessories and, in particular, to accessories for a telephone having a handset, equipped with a flash button.

BACKGROUND OF THE INVENTION

Persons confined to a bed, such as hospital patients and elderly persons in nursing homes often desire convenient access to a telephone. However, such persons may find it difficult to reach the wall or level surface where the telephone is located, even if it is next to their bed, and it can be even more difficult to squarely place the handset back in the cradle. In an emergency, it may become impossible to reach the phone.

One possible solution is to provide such confined persons with cordless telephones which may be kept in their beds. Such telephones include an on-off switch for connecting the phone to an outside line. However, cordless telephones are expensive and are often too costly for persons who are already incapacitated. Another possible solution would be to use a telephone in which the dialing mechanism is included in the handset, and to keep the handset in the bed with the incapacitated person. In such a case, the handset would be removed from the cradle of the telephone base, so the handset would not cause the switch hook on the cradle to remain depressed. A handset would usually include a flash button which would have to be kept depressed at all times to keep the phone off the lie, except during a call. However, it is very inconvenient for a person who is already incapacitated to keep a flash button manually depressed for long periods of time.

OBJECTS OF THE INVENTION

One object of the invention is to provide an easy-to-operate and inexpensive device that can keep a flash button on a telephone handset depressed when the handset is removed from its cradle.

Another object of the invention is to provide a telephone cover, which makes it unnecessary to use the hook switch o a telephone.

Another object of the invention is to provide a device that makes a telephone easier to carry.

Another object of the invention is to provide a device that can help keep a telephone handset clean.

Still other objects and advantages of the invention will become apparent to those of skill in the art after reading the following description of a preferred embodiment.

SUMMARY OF THE INVENTION

The invention is a device for selectively keeping the flash button of a telephone handset depressed. The device comprises a detachable telephone handset engaging member, which when secured to the handset depresses the flash button, thereby keeping the telephone off-line. When the handset engaging member is detached from the handset, the flash button is released and phone calls may be made. The device is easy to operate and makes it unnecessary to use the hook switch on the telephone cradle.

DETAILED DESCRIPTION OF THE PRESENT INVENTION

Figure 1:
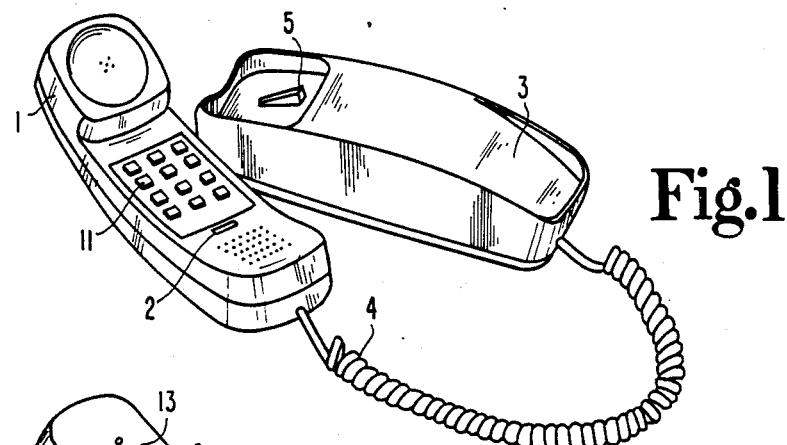
FIG. 1 shows a telephone, equipped with a flash button on the handset.

FIG. 1 shows the type of phone applicable to the present invention. The phone has a handset 1 equipped with a flash button 2. Handset 1 is connected to cradle 3 via cord 4. Cradle 3 is equipped with hook switch 5.

Figure 2:
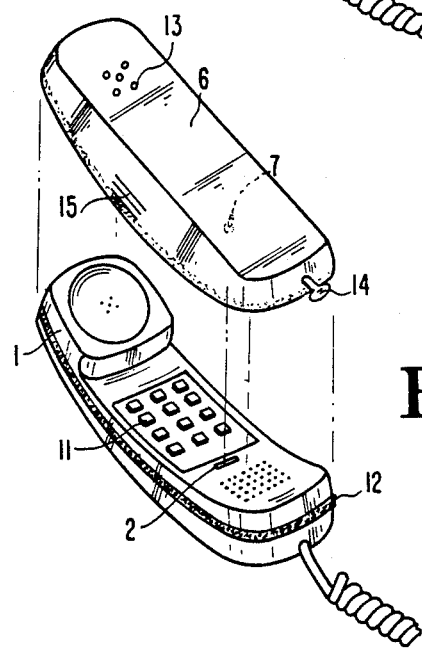
FIG. 2 shows the preferred configuration of the device of the present invention and how the device fits onto a handset equipped with a flash button.

FIG. 2 shows how telephone handset engaging member 6 fits over handset 1. Member 6 is made of one-piece molded plastic and has the following: a flat top portion, which has opposing lateral edges, opposing end edges, and holes 13: opposing lateral side portions, which have outer and inner surfaces, extend downwardly from opposing lateral edges of the flat top portion, and have ridges 15 extending partially along the outer surface of each lateral side portion; and opposing end portions, which extend downwardly from opposing end edges of the flat top portion and medially from opposing lateral side portions. The top portion of member 6 is flat so that when member 6 is attached to handset 1, the resulting unit will lay firmly on a surface, such as a table top or bed top. Holes 13 are positioned over the earpiece end of handset 1 so that sound coming from the earpiece of handset 1 will not be significantly diminished when member 6 is secured to handset 1.

On the underside of member 6 is projection 7, which is positioned so that it will depress flash button 2 when secured onto handset 1. Projection 7 is comprised of stem 8 and ball 9 (FIG. 3) and is integrally formed as a part of the one-piece molded plastic member 6.

Figure 3:
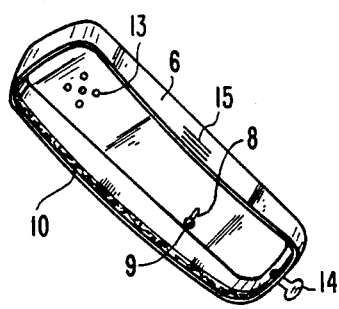
FIG. 3 shows the underside of the device of the invention.

Member 6 may be selectively secured to receiver 1 by adhesive VELCRO strip 10 (FIG. 3). VELCRO strip 10, which is sold in various adhesive strengths, is glued to the inside surface of member 6 just above the rim of member 6 as shown in FIGS. 2 and 3. Accordingly, VELCRO receiving material 12 is glued to handset 1, as shown in FIG. 2, so that when member 6 receives handset 1, the VELCRO 10 will secure member 6 to handset 1. Ridges 15 facilitate hand grasping of member 6 so that member 6 may be easily removed from handset 1.

When member 6 is secured to handset 1, the combination may be removed from the cradle and placed within easy reach, for example, in bed with a hospital patient. As flash button 2 will be depressed, a dial tone will not be generated. When member 6 is attached to handset 1, it will also help keep handset 1 clean. Member 6 may be easily removed from handset 1 and the telephone may be used by dialing the appropriate numbers on keyboard 11 (FIG. 1).

Variations to this invention may be easily made. Projection 7 (FIG. 2) may be a separate piece that is glued or screwed onto member 6. Projection 7 may be any shape (for example, a cylindrical stem or a cone-shaped projection) as long as it depresses flash button 2 when member 6 is secured onto handset 1. Other means for securing member 6 onto handset 1 are possible. For example, a threaded opening may also be provided above the rim of member 6 (see FIGS. 2 and 3) for receiving an adjustable wing bolt 14, which may be used to secure member 6 to handset 1. Also, a spring-loaded ball could be affixed to the interior surface of member 6 above the rim. When member 6 is placed onto handset 1, the spring-loaded ball could snap into an indentation in handset 1, thereby creating the necessary tension to secure member 6 to handset 1. It is not necessary that the device actually cover all of, or even most of, the face of the handset, as long as the device includes a means for depressing the flash button on the handset.

The top surface of member 6 may be curved instead of being flat. Any number of holes 13 may be provided in member 6, or member 6 could be constructed without any holes.

Many apparently widely different embodiments of this invention could be made without departing from the scope thereof, and it is intended that all matter contained in the above description or shown in the accompanying drawings shall be interpreted as illustrative and not in a limiting sense.

I claim:

1. A device for selectively keeping the flash button of a telephone handset depressed, comprising:
   a telephone handset engaging member, which substantially covers the face of the telephone handset, said member having
   means for detachably securing the member to the telephone handset; and
   means for depressing the flash button of the telephone handset when said member is secured to said handset.

2. The device of claim 1, wherein the handset engaging member is comprised of plastic.

3. The device of claim 1, wherein the means for depressing the flash button comprises a projection extending from the interior surface of the handset engaging member.

4. A deice for selectively keeping the flash button of a telephone handset depressed, comprising:
   a. a telephone handset engaging member, which substantially covers the face of the telephone handset, said member having
   b. VELCRO means for detachably securing the handset engaging member to a telephone handset; and
   c. means for depressing the flash button, comprising a projection extending from the interior surface of the handset engaging member.

5. The device of claim 4, wherein the projection comprises:
   a stem, projecting from the interior surface of the handset engaging member; and
   a ball on the end of the stem which depresses the flash button when the handset engaging member is secured to the handset.

6. The device of claim 4, wherein the handset engaging member is comprised of plastic.

7. The device of claim 6, wherein the projection is comprised of plastic.

8. The device of claim 7, wherein the handset engaging member and the projection are integrally formed.

9. The device of claim 8, wherein said handset engaging member further comprises:
   a. a flat top portion having at least one hole; and
   b. opposing lateral side portions, each having ridges extending along its outer surface.

10. The device of claim 5, wherein the stem and the ball are comprised of plastic.

11. The device of claim 10, wherein the handset engaging member and the projection are integrally formed.

12. The device of claim 11, wherein said handset engaging member further comprises:
   a. a flat top portion having at least one hole and
   b. opposing lateral side portions, each having ridges extending along its outer surface.

13. A device for selectively keeping the flash button of a telephone handset depressed, comprising:
   a. a telephone handset engaging member, which substantially covers the face of the telephone handset, said member having
   b. means for detachably securing the handset engaging member to a telephone handset, comprising:
      (1) an adjustable wing bolt; and
      (2) a threaded opening in the handset engaging member; and
   c. means for depressing the flash button, comprising a projection extending from the interior surface of the handset engaging member.

14. A device for selectively keeping the flash button of a telephone handset depressed, comprising:
   a telephone handset engaging member, which substantially covers the face of the telephone handset, said member having
   VELCRO means for detachably securing the member to a telephone handset; and means for depressing the flash button of the telephone handset when said member is secured to said handset.

15. A device for selectively keeping the flash buttons of a telephone handset depressed, comprising:
   a telephone handset engaging member, which substantially covers the face of the telephone handset, said member having
   means for detachably securing the member to a telephone handset, comprising an adjustable wing bolt and a threaded opening in the handset engaging member; and
   means for depressing the flash button of the telephone handset when said member is secured to said handset.

16. A device for selectively keeping the flash button of a telephone handset depressed, comprising:
   a. a telephone handset engaging member, which substantially covers the face of the telephone handset, said member having
   b. means for detachably securing the member to a telephone handset; and
   c. means for depressing the flash button of the telephone handset when said member is secured to said handset, wherein the means for depressing the flash button comprises a projection extending from the interior surface of the handset engaging member, said projection comprising
      (1) a stem, projecting from the interior surface of the handset engaging member, and
      (2) a ball on the end of the stem which depresses the flash button when the handset engaging member is secured to the handset.

17. A device for selectively keeping the flash button of a telephone handset depressed, comprising:
   a telephone handset engaging member, which substantially covers the face of the telephone handset, said member having
   a. a flat top portion having at least one hole;
   b. opposing lateral side portions, each having ridges extending along its outer surface;
   c. means for detachably securing the member to a telephone handset; and
   d. means for depressing the flash button of the telephone handset when said member is secured to said handset.

* * * * *